No. 782,406. Patented February 14, 1905.

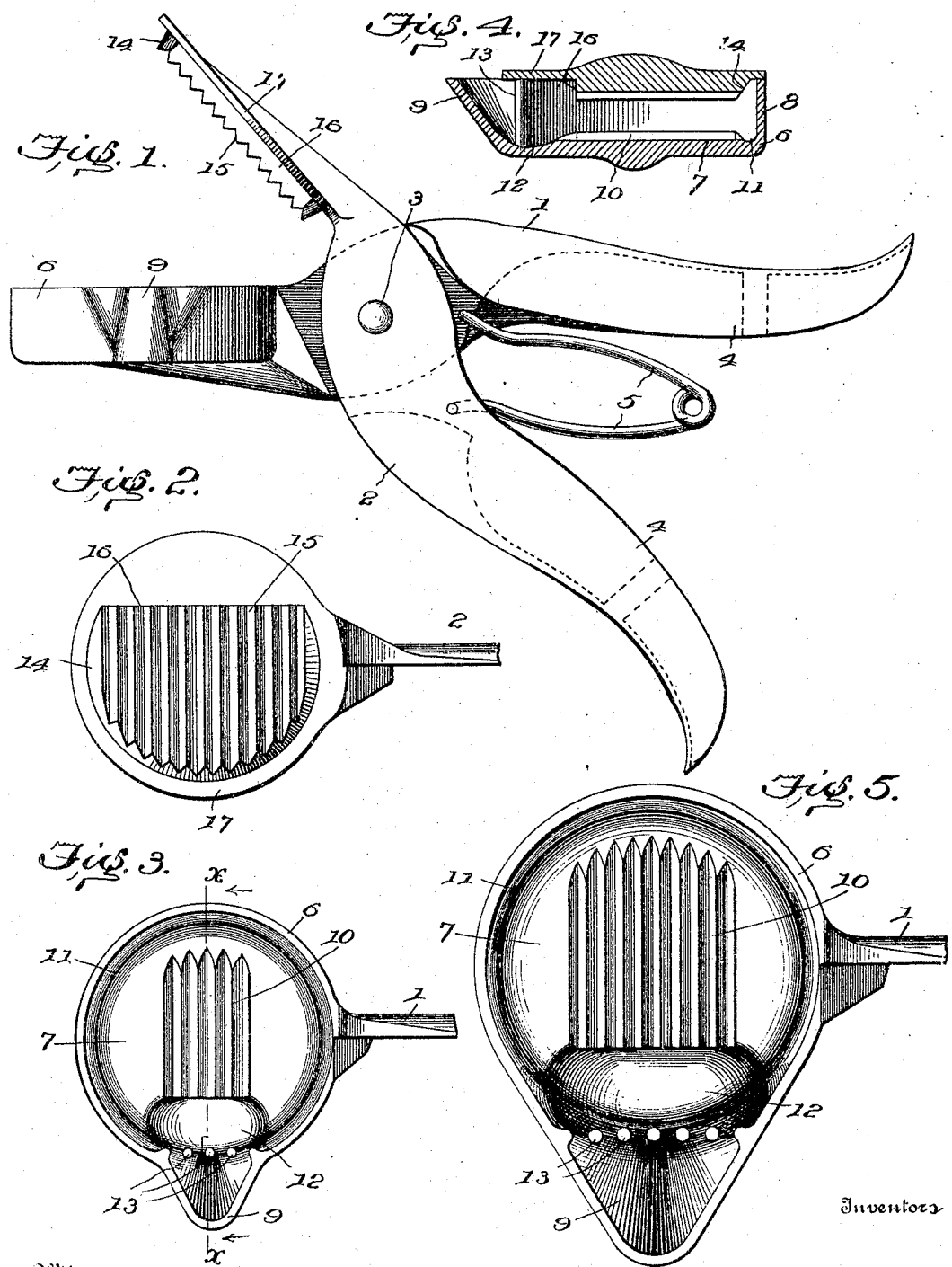

UNITED STATES PATENT OFFICE.

FREDERICK W. MAYHEW AND WALTER W. HILDERHOF, OF SPRINGFIELD, OHIO, ASSIGNORS TO ALBERT J. PERKS AND HERMAN VOGES, JR., OF SPRINGFIELD, OHIO.

SQUEEZER.

SPECIFICATION forming part of Letters Patent No. 782,406, dated February 14, 1905.

Application filed January 18, 1904. Serial No. 189,423.

*To all whom it may concern:*

Be it known that we, FREDERICK W. MAYHEW and WALTER W. HILDERHOF, citizens of the United States, residing at Springfield, in the county of Clark and State of Ohio, have invented certain new and useful Improvements in Squeezers, of which the following is a specification, reference being had therein to the accompanying drawings.

This invention relates to squeezers, and more particularly to squeezers adapted for use in extracting the juice of lemons, limes, and other like fruits.

The invention has for its object to provide a simple, strong, and inexpensive device which may be readily manipulated for the purpose of extracting the juice, while at the same time the person of the operator will be protected from the juice, which will be retained within the bowl of the squeezer.

To these and other ends our invention consists in certain novel features which we will now proceed to describe and will then particularly point out in the claims.

In the accompanying drawings, Figure 1 is an elevation of a squeezer embodying our invention in one form. Fig. 2 is a face view of the under or inner side of the plunger and plunger-head detached. Fig. 3 is a similar view of the bowl or cup. Fig. 4 is a sectional view taken on a line corresponding with the line x x of Fig. 3 and looking in the direction of the arrows, showing the parts closed together; and Fig. 5 is a view similar to Fig. 3, showing a larger form of the device adapted for use with lemons, the smaller form (shown in Figs. 1 to 4, inclusive) being more particularly adapted for use with limes.

Referring to the said drawings, it will be seen that the device comprises two levers 1 and 2, pivoted between their ends at 3, the parts of said levers on one side of the pivot forming handles, while the parts on the other side carry, respectively, the bowl and plunger, to be hereinafter referred to. The handle portions of the levers are indicated by the reference-numeral 4, and a spring 5, located between said handle portions and having its ends respectively connected thereto, serves to normally separate said handle portions and also the bowl and plunger. The spring 5 lies in the plane of movement of the handle portions, and these latter are hollowed out, as indicated in dotted lines in Fig. 1, so as to receive and cover the spring when the handles are pressed together.

The lever 1 carries the bowl 6, which comprises a substantially flat bottom 7 and a cylindrical wall 8, the latter being provided at one side with a lateral pouring-spout 9. The upper surface of the bottom 7 is provided with a series of transverse ribs and grooves 10, extending across the central portion thereof toward the pouring-spout 9, and a circular gutter or conduit 11 is formed around said bottom at the junction thereof with the wall 8. Immediately back of the pouring-spout is located a depression or receiving-basin 12, at which the corrugations and grooves 10 terminate, and a plurality of upright pins 13 are located between this receiving-basin and the pouring-spout, said pins being spaced apart at such a distance as to form a straining device to prevent the seeds and large portions of pulp from passing through the same.

The lever 2 carries the plunger 14, which is of a size such as to adapt it to enter the cup or bowl 6. Its under face is provided with alternate corrugations and grooves 15, extending transversely thereof parallel with the corrugations and grooves 10 of the cup, and the body of said plunger is cut away above the receiving-basin 12, as indicated at 16. There is thus formed a large clearance-space between the squeezing-surfaces of the plunger and bowl on one side and the strainer-protected receiving-mouth of the pouring-spout on the other side, the receiving-basin 12 lying at the bottom of this space to receive the juice, while the space itself is adapted to receive the pulp and seed and permit them to drain into the receiving-basin.

The plunger 15 is provided with a cover portion 17 of a diameter at least equal to that of the cup or bowl 6, said cover portion being in the form of an outwardly-extending flange which fits upon the upper edge of the bowl when the parts are closed, as shown in Fig. 4, closing the space between the plunger and cup, so as to prevent the escape of the juice except at the pouring-spout. This cover portion also serves as a shield to intercept any jets of juice which might otherwise spurt out during the squeezing operation, and thus serves to protect the operator therefrom.

The operation of the device will be readily understood. The fruit to be squeezed is cut in halves, and one of the halves is placed in the cup 6, whereupon the handle portions 4 of the levers 1 and 2 are brought together and the fruit is squeezed between the corrugated portions 10 and 15 of the cup and plunger. The corrugations serve to hold the fruit firmly and prevent its being forced to that side of the cup farthest from the handles by the angular descent of the plunger. Said corrugations also serve to conduct the juice to the receiving-basin 12, and the conduit 11 also operates to this end. The clearance-space between the parts above the receiving-basin accommodates the seeds and pulp without clogging the device, and the juice gathers in the receiving-basin, from which it can be readily poured. When the parts are fully brought together, as shown in Fig. 4, the squeezed fruit and its juice are held in a closed vessel or cup, the only outlet from which is the pouring-spout, to reach which the juice must pass through the strainer provided with the pins 13. The juice can thus only be discharged at the proper place and must be strained in so discharging. The operation is simple and quick and may be readily effected by one hand, and the spring insures the separation of the parts after the operation without necessitating the use of the other hand, whereupon the squeezed fruit, pulp, and seeds may be readily discharged.

The implement shown in Figs. 1 to 4 is of relatively small size for use in squeezing limes; but by a simple increase in dimensions and in the number of corrugations and straining-pins the device may be adapted for use with lemons and larger fruit, as shown in Fig. 5.

The implement may be made of any suitable material; but we prefer to construct the levers, as well as the cup and plunger, which are preferably integral with their respective levers, of cast aluminium on account of its lightness and non-corroding qualities.

We do not wish to be understood as limiting ourselves strictly to the precise details of construction hereinbefore described, and shown in the accompanying drawings, as the same may obviously be modified without departing from the principle of our invention.

Having thus fully described our invention, what we claim as new, and desire to secure by Letters Patent, is—

1. A portable fruit-squeezer comprising crossed levers pivoted at their intersection, said levers having handle portions on one side of the pivot and being respectively provided on the other side of the pivot with a horizontal cup and with a plunger adapted to enter the same, the cup having an imperforate body and being provided with a laterally-extending pouring-spout, the plunger being provided with a flange forming a cover portion to close the mouth of the cup, beyond which cover portion the pouring-spout extends, and a strainer carried by the cup and permanently located between the main body of the cup and the receiving end of the pouring-spout, substantially as described.

2. A portable fruit-squeezer comprising crossed levers pivoted at their intersection, and provided with a spring to separate the same, said levers having handle portions on one side of the pivot and being respectively provided on the other side of the pivot with a horizontal cup and with a plunger adapted to enter the same, the cup having an imperforate body and being provided with a laterally-extending pouring-spout, the plunger being provided with a flange forming a cover portion to close the mouth of the cup, beyond which cover portion the pouring-spout extends, and a strainer carried by the cup and permanently located between the main body of the cup and the receiving end of the pouring-spout, substantially as described.

3. A portable fruit-squeezer comprising crossed levers pivoted at their intersection and a spring interposed between said levers to separate the same, said levers having handle portions on one side of the pivot and being respectively provided on the other side of the pivot with a horizontal cup and with a plunger adapted to enter the same, the cup having an imperforate body and being provided with a laterally-extending pouring-spout, and with spaced pins or projections extending up from the bottom of the cup at the receiving end of the pouring-spout to form a strainer, and the plunger being provided with a flange forming a cover portion to close the mouth of the cup, beyond which cover portion the pouring-spout extends, substantially as described.

4. A fruit-squeezer, comprising crossed levers, one of which is provided with a horizontal cup having a substantially horizontal bottom constituting a squeezing-surface, a lateral pouring-spout, a depression between the squeezing-surface and pouring-spout, constituting a receiving-basin, and spaced pins forming a strainer between the receiving-basin and pouring-spout, the other lever being provided with a plunger having a squeezing-surface cooperating with that of the cup, substantially as described.

5. In a fruit-squeezer, a cup having a substantially flat bottom, a lateral pouring-spout extending upward and outward from said bottom, and a strainer composed of spaced pins extending upward from the bottom of the cup across the receiving-mouth of the pouring-spout, substantially as described.

6. In a fruit-squeezer, a cup having a substantially flat bottom, a lateral pouring-spout extending upward and outward from said bottom, and spaced pins extending from the bottom to the top of the cup across the receiving-mouth of the pouring-spout, in combination with a plunger adapted to enter the cup, said plunger being provided with a flange extending over and resting upon the edge of the cup and the upper ends of the pins, the pouring-spout extending beyond said flange, substantially as described.

7. A fruit-squeezer, comprising crossed levers pivoted at their intersection, one of said levers being provided with a cup having a pouring-spout and a horizontal bottom provided with transverse corrugations, a depression constituting a receiving-basin between the corrugations and pouring-spout, strainer-pins between said basin and spout, and an annular groove or conduit, the other lever being provided with a similarly-corrugated plunger having a cover-flange to close the cup, and a spring for separating said levers, substantially as described.

In testimony whereof we affix our signatures in presence of two witnesses.

FREDERICK W. MAYHEW.
WALTER W. HILDERHOF.

Witnesses:
E. O. HAGAN,
IRVINE MILLER.